United States Patent
Nagashima et al.

(10) Patent No.: US 11,325,589 B2
(45) Date of Patent: May 10, 2022

(54) VEHICLE CONTROL DEVICE

(71) Applicant: HONDA MOTOR CO., LTD., Tokyo (JP)

(72) Inventors: Masaaki Nagashima, Wako (JP); Hideki Matsunaga, Wako (JP); Takeru Goto, Wako (JP); Hirokiyo Kasahara, Wako (JP); Yoshimitsu Murahashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 140 days.

(21) Appl. No.: 16/761,575

(22) PCT Filed: Nov. 6, 2017

(86) PCT No.: PCT/JP2017/039877
§ 371 (c)(1),
(2) Date: May 5, 2020

(87) PCT Pub. No.: WO2019/087380
PCT Pub. Date: May 9, 2019

(65) Prior Publication Data
US 2021/0146917 A1   May 20, 2021

(51) Int. Cl.
*B60W 30/08*  (2012.01)
*B60R 21/0134*  (2006.01)
*B60W 10/20*  (2006.01)

(52) U.S. Cl.
CPC ......... *B60W 30/08* (2013.01); *B60R 21/0134* (2013.01); *B60W 10/20* (2013.01); *B60W 2710/20* (2013.01)

(58) Field of Classification Search
CPC .. B60W 30/08; B60W 10/20; B60W 2710/20; B60W 2540/30; B60W 2554/20;
(Continued)

(56) References Cited

U.S. PATENT DOCUMENTS 6,571,176 B1   5/2003  Shinmura et al.
10,317,907 B2*  6/2019  Shami .................. B60W 50/14
(Continued)

FOREIGN PATENT DOCUMENTS

JP   2000-357299 A   12/2000
JP   2006-044445 A    2/2006
(Continued)

OTHER PUBLICATIONS

PCT/ISA/210 from PCT/JP2017/039877 with the English translation thereof.

*Primary Examiner* — Jonathan M Dager
*Assistant Examiner* — Jean W Charleston
(74) *Attorney, Agent, or Firm* — Carrier Blackman & Associates, P.C.; Joseph P. Carrier; Jeffrey T. Gedeon

(57) ABSTRACT

This vehicle control device comprises: action amount determination units that determine evasive action amounts indicating the degree of evasive action relative to a recognized obstacle; and a travel control unit that performs travel control whereby a vehicle is caused to take evasive action corresponding to the determined evasive action amount. The action amount determination units determine the amount of evasive action, according to user preferences for the vehicle.

8 Claims, 8 Drawing Sheets

(58) Field of Classification Search
CPC ......... B60W 2554/60; B60W 2556/10; B60W 10/04; B60W 10/184; B60W 30/09; B60W 30/095; B60W 40/09; B60W 50/14; B60W 60/0011; B60R 21/0134; B60R 16/0231; B60R 16/0239; B60T 7/12; B62D 6/00; G08G 1/16
USPC .......................................................... 701/41
See application file for complete search history.

(56) References Cited

U.S. PATENT DOCUMENTS

| | | | |
|---|---|---|---|
| 2015/0274162 A1* | 10/2015 | Sato .................. | B60W 30/08 |
| | | | 701/1 |
| 2017/0057498 A1* | 3/2017 | Katoh ................. | B60W 40/105 |
| 2019/0084561 A1* | 3/2019 | Takeda ................ | G08G 1/166 |
| 2019/0106120 A1* | 4/2019 | Hatano ............. | G08G 1/096708 |
| 2020/0180638 A1* | 6/2020 | Kanoh ............... | B60W 30/095 |
| 2021/0146943 A1* | 5/2021 | Oniwa ............... | B60W 50/085 |
| 2021/0197808 A1* | 7/2021 | Maeda ............... | B60W 40/04 |

FOREIGN PATENT DOCUMENTS

| | | |
|---|---|---|
| JP | 2017-043262 A | 3/2017 |
| JP | 2017-077829 A | 4/2017 |

\* cited by examiner

FIG. 6A

| PLANT ATTRIBUTE | INFLUENCE DEGREE (HARDNESS LEVEL) |
|---|---|
| TREE | HIGH |
| GRASS | LOW/MIDDLE |
| JAPANESE PAMPAS GRASS | LOW |
| ⋮ | ⋮ |
| TALL | HIGH |
| SMALL | LOW/MIDDLE |
| THICK STEM | HIGH |
| THIN STEM | LOW/MIDDLE |
| ⋮ | ⋮ |
| SHAKING IS LARGE | LOW |
| SHAKING IS SMALL | HIGH |
| ⋮ | ⋮ |

ACTION TYPE A

| INFLUENCE DEGREE (HARDNESS LEVEL) | ACTION ATTRIBUTE | AVOIDANCE ACTION AMOUNT |
|---|---|---|
| HIGH | AVOIDANCE WITH ENOUGH MARGIN | X |
| MIDDLE | NORMAL AVOIDANCE | Y |
| LOW | CONTACT IS ALLOWED | Z |
| UNKNOWN | NORMAL AVOIDANCE | Y |

I2

VEHICLE CONTROL DEVICE

TECHNICAL FIELD

The present invention relates to a vehicle control device that performs travel control of a user's own vehicle at least partially automatically.

BACKGROUND ART

Techniques of performing travel control of a user's own vehicle at least partially automatically (automated driving technique or driving assistance technique) have heretofore been developed. For example, various techniques to deal with an obstacle on a scheduled travel route as appropriate have been suggested.

Japanese Laid-Open Patent Publication No. 2017-043262 suggests a device that recognizes, as an obstacle, a three-dimensional object such as a tree ahead of the user's own vehicle, and performs automated brake and automated steering in a case where the user's own vehicle is highly likely to come into contact with this obstacle.

SUMMARY OF INVENTION

Incidentally, it is assumed that a tendency of an avoidance action with respect to an obstacle depends on each user (including driver). For example, when soft grass or tree protrudes largely to the inside of a road, users react differently; for example, some users want to avoid the grass or tree with their desired margin (distance or time) and other users do not care about passing the road while being in contact with the grass or tree.

However, in the technique suggested in Japanese Laid-Open Patent Publication No. 2017-043262, the difference in decision making as described above is not considered at all. As a result, if the avoidance action that does not suit driver's intention is taken by the automated driving, the driver may feel uncomfortable.

The present invention has been made to solve the above problem, and an object is to provide a vehicle control device that can improve the merchantability of a vehicle in a situation where the vehicle avoids an obstacle.

A vehicle control device according to the present invention is a device that performs travel control of a user's own vehicle at least partially automatically, and the vehicle control device includes: an obstacle recognition unit configured to recognize an obstacle on a scheduled travel route of the user's own vehicle; an action amount decision unit configured to decide an avoidance action amount indicating a degree of an avoidance action with respect to the obstacle recognized by the obstacle recognition unit; and a travel control unit configured to perform travel control that causes the user's own vehicle to take the avoidance action in accordance with the avoidance action amount decided by the action amount decision unit, wherein the action amount decision unit is configured to decide the avoidance action amount in accordance with preference of a user who is involved with the user's own vehicle.

As described above, the avoidance action amount indicating the degree of the avoidance action with respect to the obstacle is decided in accordance with the preference of the user who is involved with the user's own vehicle. Thus, the avoidance action that appropriately reflects user's driving intention can be taken. Therefore, the merchantability of the vehicle in a situation where the vehicle avoids the obstacle can be improved.

The action amount decision unit may decide the avoidance action amount so as to pass the obstacle while being in contact with the obstacle at a smaller contact area than in a case where the avoidance action is not taken. Thus, another option for the avoidance action is added in which the user's own vehicle is permitted to pass the obstacle while being in contact with the obstacle. Therefore, discretion for driving can be increased.

The action amount decision unit may decide the avoidance action amount, also based on an influence degree of contact with the obstacle. Thus, the avoidance action in accordance with the influence degree of the contact can be taken.

The action amount decision unit may evaluate the influence degree, based on a characteristic of the obstacle, and decide the avoidance action amount, based on the obtained influence degree. Since the characteristic of the obstacle is considered, the accuracy of an evaluation result of the influence degree is increased.

The action amount decision unit may give the influence degree of a particular obstacle that is an obstacle whose only tip portion is shaking, an obstacle that extends obliquely from outside of a road to inside thereof, or an obstacle that has a morphological characteristic of a plant, a lower evaluation than the obstacle other than the particular obstacle, and decide the avoidance action amount, based on the obtained influence degree. Thus, the avoidance action with respect to the particular obstacle that is probably a plant can be suppressed, so that the influence on other traffic participants around the particular obstacle is decreased.

The action amount decision unit may decide the avoidance action amount in accordance with material value of the user's own vehicle. Thus, the avoidance action in accordance with the material value of the user's own vehicle can be selected while considering a possibility that the contact with the obstacle causes the user's own vehicle to be scratched or dented.

The vehicle control device may further include a parameter input unit through which a parameter that is used for deciding the avoidance action amount is input in accordance with user's operation, wherein the action amount decision unit may decide the avoidance action amount by using the parameter that is input from the parameter input unit. Thus, the driving intention of the user can be confirmed through the user's operation.

The vehicle control device may further include a driving tendency analysis unit configured to analyze a driving tendency of a driver of the user's own vehicle, which is a user, by using driving history information about past driving performed by the driver, wherein the action amount decision unit may decide the avoidance action amount in accordance with the driving tendency of the driver analyzed by the driving tendency analysis unit. Thus, the driving intention of the driver can be reflected automatically without the need for the driver to perform a special operation.

The driving tendency analysis unit may analyze the driving tendency only in a case where the driver performs manual driving. Since only the driving operation by the driver is extracted and analyzed, the driving tendency of the driver can be grasped with high accuracy.

In the vehicle control device according to the present invention, the merchantability of the vehicle in the situation where the vehicle avoids the obstacle can be improved.

BRIEF DESCRIPTION OF DRAWINGS

FIG. 6A is a diagram illustrating one example of a data structure of influence degree information, and FIG. 6B is a diagram illustrating one example of a data structure of preference information;

DESCRIPTION OF EMBODIMENT

A preferred embodiment of a vehicle control device according to the present invention is hereinafter described with reference to the attached drawings.

[Configuration of Vehicle Control Device 10]

Figure 1:
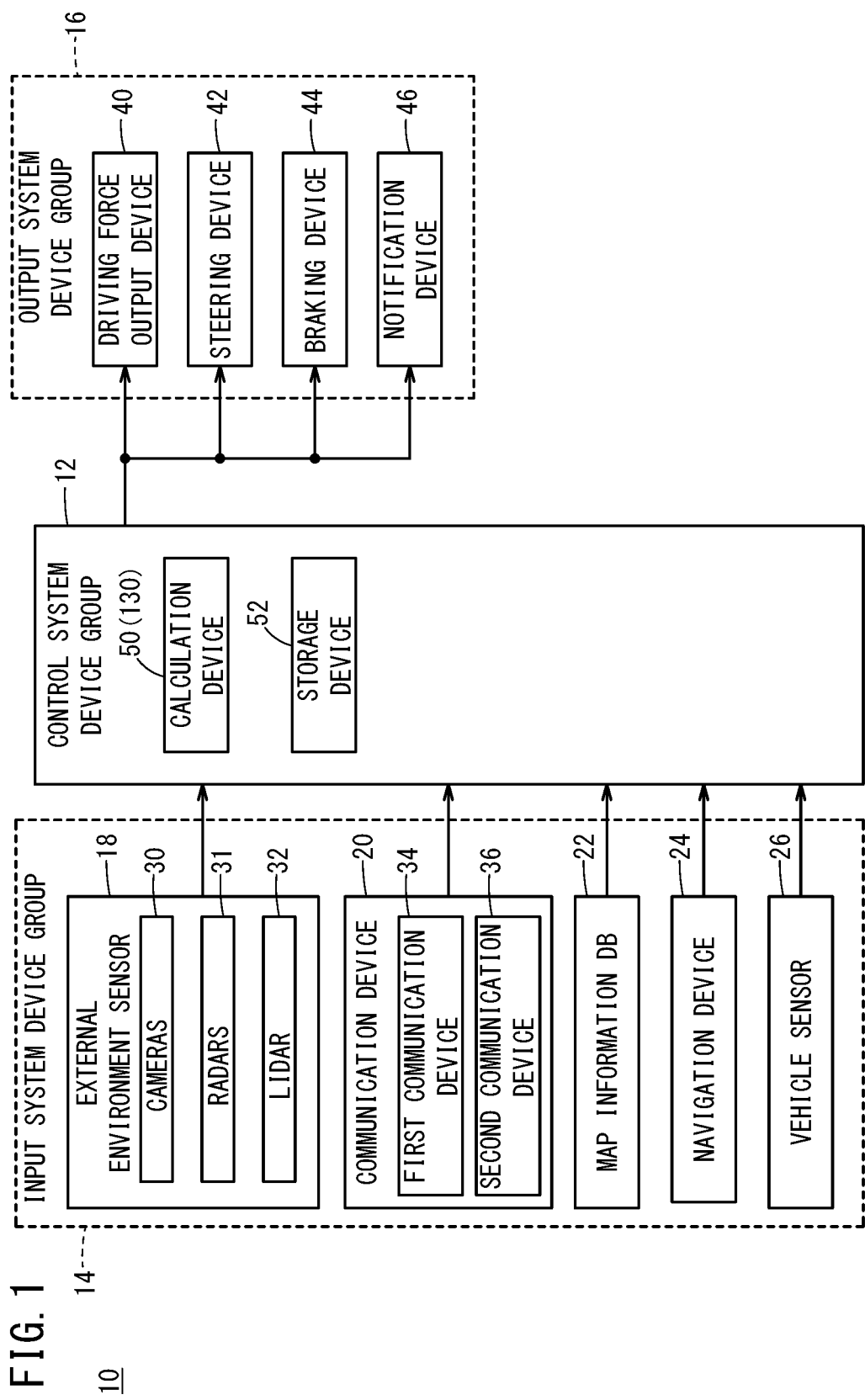
FIG. 1 is a block diagram illustrating a configuration of a vehicle control device according to one embodiment of the present invention.

FIG. 1 is a block diagram illustrating a configuration of a vehicle control device 10 according to one embodiment of the present invention. The vehicle control device 10 is incorporated into a vehicle (user's own vehicle 100 in FIG. 4, for example), and performs driving control of the vehicle automatically or manually. The "automated driving" refers to a concept including not just "fully automated driving" in which travel control of the vehicle is fully automated, but also "partial automated driving" in which the travel control is partially automated.

The vehicle control device 10 includes a control system device group 12 that collectively controls the driving of the vehicle, a device group (hereinafter referred to as an input system device group 14) that performs an input function of the control system device group 12, and a device group (hereinafter referred to as an output system device group 16) that performs an output function of the control system device group 12.

<Specific Configuration of Input System Device Group 14>

The input system device group 14 includes: an external environment sensor 18 that detects a state of a periphery (external environment) of the vehicle; a communication device 20 that exchanges information with various communication devices outside the vehicle; a high-precision map database (hereinafter, map information DB 22) that acquires map information showing a high-precision map; a navigation device 24 that generates a travel route to a destination and measures a travel position of the vehicle; and a vehicle sensor 26 that detects a state of the vehicle.

The external environment sensor 18 includes one or more cameras 30 that capture images of the external environment, one or more radars 31 that detect the distance and the relative speed between the vehicle and another object, and one or more LIDARs (Light Detection and Ranging/Laser Imaging Detection and Ranging) 32.

The communication device 20 includes a first communication device 34 that performs vehicle-to-vehicle communication with another vehicle, and a second communication device 36 that performs road-to-vehicle communication with a road-side device. The navigation device 24 includes a satellite navigation system and a self-contained navigation system. The vehicle sensor 26 includes various sensors that detect behavior of the vehicle, such as a vehicle speed sensor, an acceleration sensor, a yaw rate sensor, and an inclination sensor, various sensors that detect an operation state of the vehicle, and various sensors that detect a state of a driver.

Note that the navigation device 24 functions as an HMI (Human Machine Interface; parameter input unit) through which a parameter can be input in accordance with user's operation. The parameter is used when an avoidance action amount to be described below is decided.

<Specific Structure of Output System Device Group 16>

The output system device group 16 includes a driving force output device 40, a steering device 42, a braking device 44, and a notification device 46.

The driving force output device 40 includes a driving force output electronic control unit (ECU), and a driving source such as an engine or a traction motor. The driving force output device 40 generates driving force in response to driver's operation on an accelerator pedal or a driving control instruction that is output from the control system device group 12.

The steering device 42 includes an electric power steering system (EPS)-ECU, and an EPS actuator. The steering device 42 generates steering force in response to driver's operation on a steering wheel or a steering control instruction that is output from the control system device group 12.

The braking device 44 includes a brake ECU and a brake actuator. The braking device 44 generates braking force in response to driver's operation on a brake pedal or a braking control instruction that is output from the control system device group 12.

The notification device 46 includes a notification ECU and an information transmission device (such as a display device, an acoustic device, or a tactile device). The notification device 46 notifies the driver of various pieces of information, in response to a notification instruction that is output from the control system device group 12 or another ECU (for example, provides information through any of five senses including visual and auditory senses).

<Specific Configuration of Control System Device Group 12>

The control system device group 12 includes one or more ECUs, and includes a calculation device 50 such as a processor and a storage device 52 such as a ROM or a RAM. The control system device group 12 achieves various functions by the calculation device 50 executing programs stored in the storage device 52.

Figure 2:
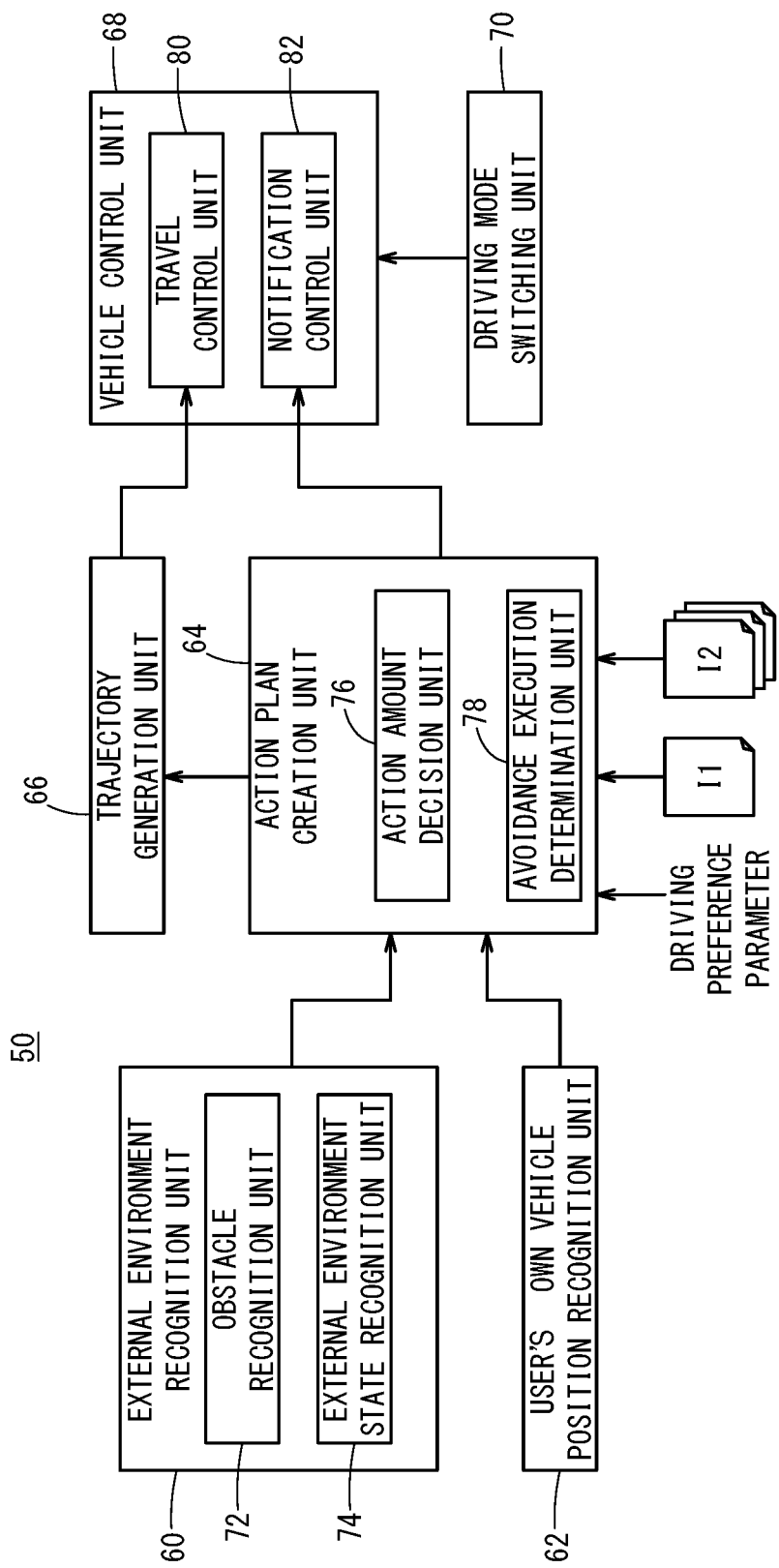
FIG. 2 is a function block diagram of a calculation device illustrated in FIG. 1.

FIG. 2 is a function block diagram of the calculation device 50 illustrated in FIG. 1. This calculation device 50 is configured to perform various functions of an external environment recognition unit 60, a user's own vehicle position recognition unit 62, an action plan creation unit 64, a trajectory generation unit 66, a vehicle control unit 68, and a driving mode switching unit 70.

The external environment recognition unit 60 recognizes a circumstance and an object around the vehicle, on the basis of the information output from the external environment sensor 18. This external environment recognition unit 60 includes an obstacle recognition unit 72 and an external environment state recognition unit 74.

The user's own vehicle position recognition unit 62 recognizes an absolute position of the vehicle or a relative position of the vehicle on the high-precision map (hereinafter also referred to as user's own vehicle position) on the basis of the information output from the navigation device 24 and the map information DB 22.

The action plan creation unit 64 creates an action plan in accordance with a situation of the vehicle (events in time series for each travel section) on the basis of recognition results from the external environment recognition unit 60 and the user's own vehicle position recognition unit 62, and updates contents of the action plan as necessary. The action plan creation unit 64 includes an action amount decision unit 76 and an avoidance execution determination unit 78. Note that the action plan creation unit 64 is also configured so that a driving preference parameter, influence degree information I1, and preference information I2 can be input.

The trajectory generation unit 66 generates a travel trajectory (target behavior in time series) in accordance with the action plan created by the action plan creation unit 64, on the basis of the recognition results from the external environment recognition unit 60 and the user's own vehicle position recognition unit 62.

The vehicle control unit 68 instructs the output system device group 16 (FIG. 1) to operate on the basis of a creation result from the action plan creation unit 64 or a generation result from the trajectory generation unit 66. The vehicle control unit 68 includes a travel control unit 80 that performs the travel control of the vehicle, and a notification control unit 82 that performs notification control for the driver.

The driving mode switching unit 70 is configured to switch a plurality of driving modes including "automated driving mode" and "manual driving mode" in response to a driver's predetermined action (for example, the operation of an input device including a mode selection switch and the steering wheel).

[Operation of Vehicle Control Device 10]

The vehicle control device 10 according to the present embodiment is configured as above. Subsequently, operation of the vehicle control device 10 when the vehicle avoids a particular obstacle 108 (for example, FIG. 4) is described mainly with reference to a flowchart in FIG. 3. In this example, it is assumed that the user's own vehicle 100 including the vehicle control device 10 travels by automated driving.

Figure 4:
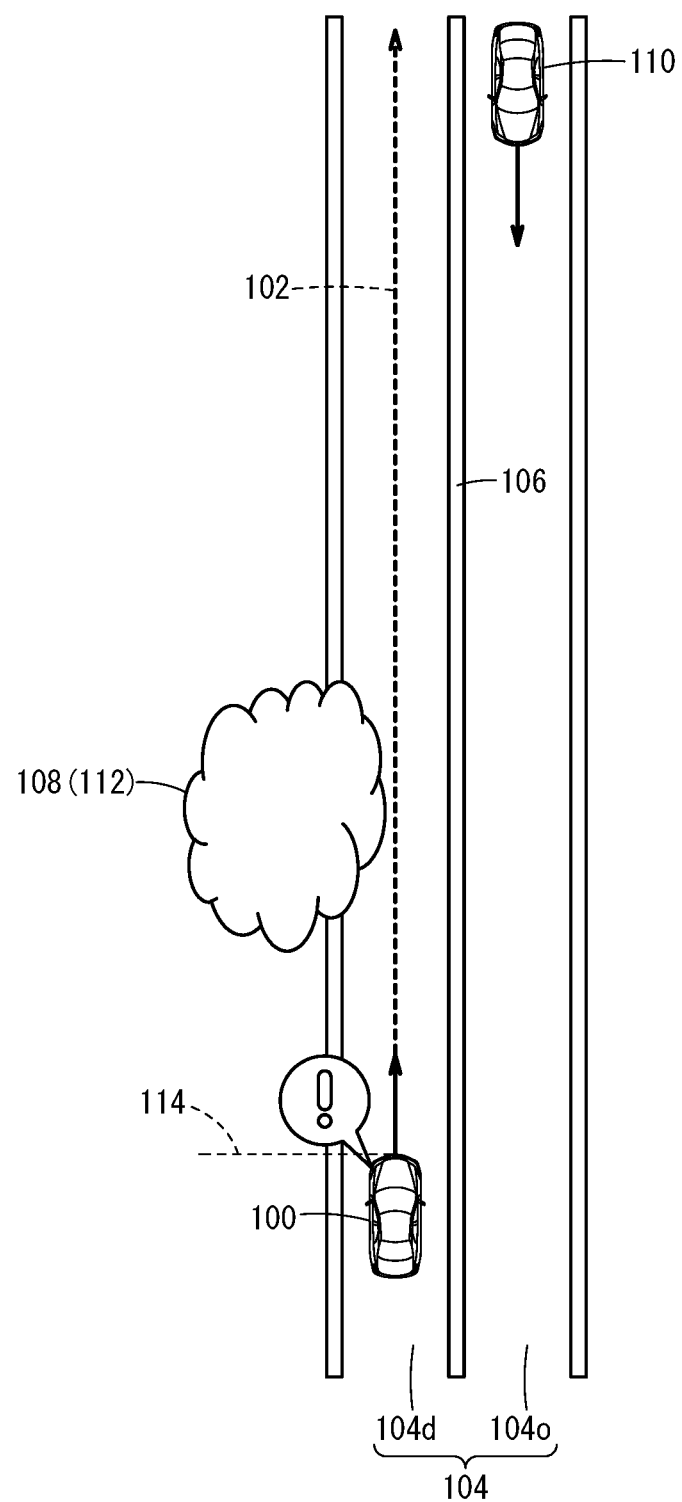
FIG. 4 is a diagram illustrating one example of a traveling situation around a user's own vehicle.

FIG. 4 is a diagram illustrating one example of a traveling situation around the user's own vehicle 100. The user's own vehicle 100 will travel straight on a road 104 along a scheduled travel route 102, which is shown by a dashed arrow. Here, the scheduled travel route 102 means a route where the user's own vehicle 100 is scheduled to travel.

This drawing shows a road 104 in an area or region subject to a traffic regulation that automobiles should keep to "the left". The road 104 is sectioned into two lanes by a lane mark 106 having a continuous line shape. This road 104 includes a travel lane 104d where the user's own vehicle 100 travels and an opposite lane 104o that is opposite to the travel lane 104d.

On the travel lane 104d, there is a plant (hereinafter, referred to as a particular obstacle 108) in front of the user's own vehicle 100, the plant protruding from the outside of the road 104. Moreover, another vehicle 110 is traveling on the opposite lane 104o in a state where the other vehicle 110 faces the user's own vehicle 100.

Figure 3:
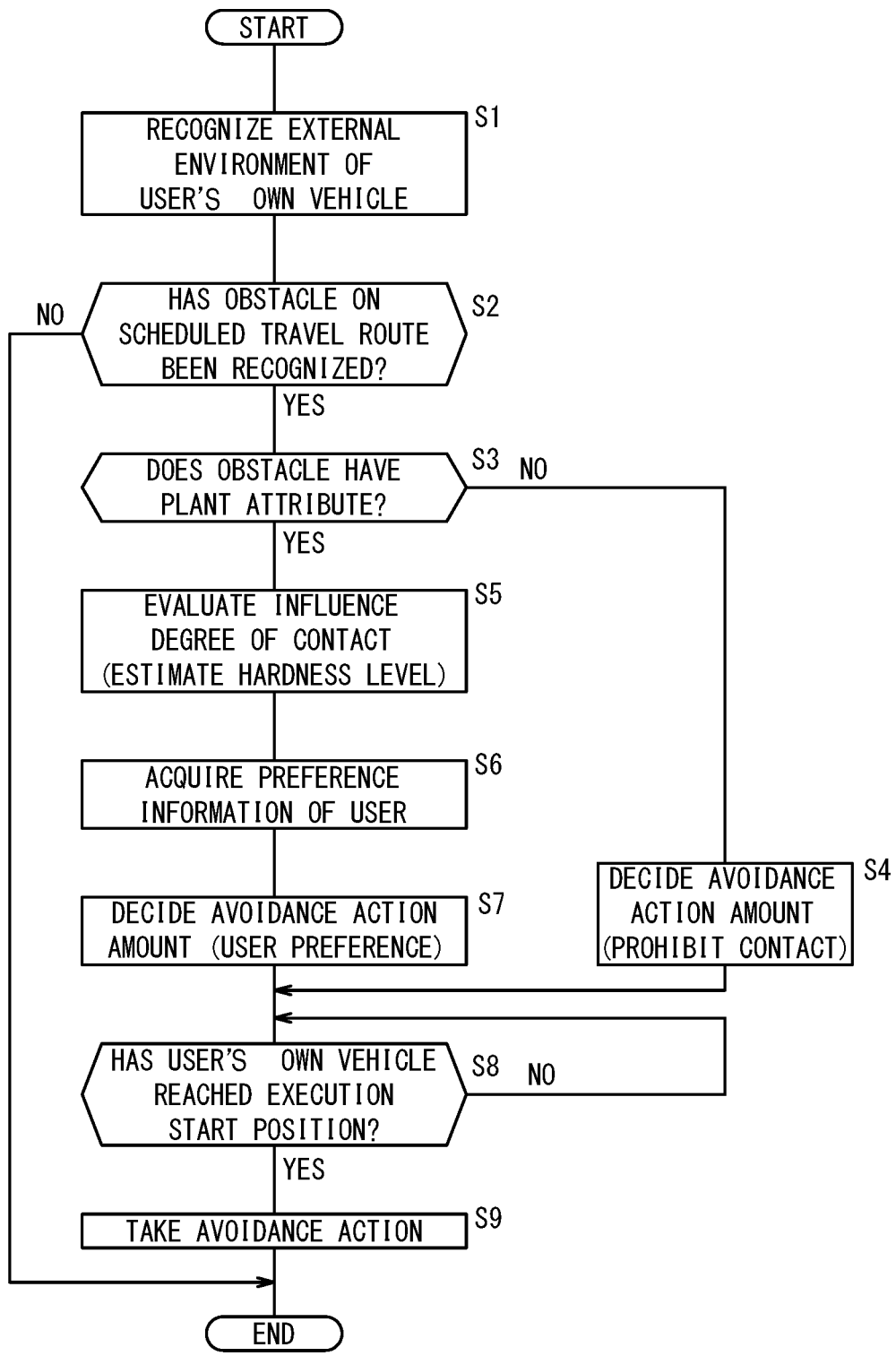
FIG. 3 is a flowchart for describing operation of the calculation device illustrated in FIG. 2.

In step S1 in FIG. 3, the external environment recognition unit 60 recognizes the circumstance and the object around the user's own vehicle 100 on the basis of the information output from the external environment sensor 18.

For example, the obstacle recognition unit 72 recognizes the presence or absence, the position, the size, the type, and the movement of an obstacle 112 that moves or stops around the user's own vehicle 100, on the basis of the information output from the camera 30, the radar 31, or the LIDAR 32.

For example, the external environment state recognition unit 74 recognizes an overall road environment, such as the shape and the width of the road, the position of the lane mark 106, the number and the width of the lane, the lighting state of a traffic light, the open/close state of a crossing gate, and the like, on the basis of the image information from the camera 30 or the map information (high-precision map) read out from the map information DB 22.

In step S2, the obstacle recognition unit 72 confirms whether it has been recognized that there is an obstacle 112 (a plant in example in FIG. 4) on the scheduled travel route 102 of the user's own vehicle 100. If the obstacle 112 has not been recognized (step S2: NO), the flowchart in FIG. 3 ends. On the other hand, if the user's own vehicle 100 recognizes the obstacle 112 for the first time when having reached a recognition position 114 (step S2: YES), the process advances to the next step S3.

In step S3, the obstacle recognition unit 72 determines whether the obstacle 112 recognized in step S1 has "plant attribute". For example, [1] if only a tip portion of the obstacle 112 is shaking, [2] if the obstacle 112 extends obliquely from the outside of the road 104 to the inside thereof, or [3] if the coincidence degree between the obstacle 112 and a template image that is associated with a type of plant (for example, Japanese pampas grass) is high, the obstacle recognition unit 72 determines that the obstacle 112 has "plant attribute" (that is, the obstacle 112 is the particular obstacle 108).

Figure 5A:
FIG. 5A is a diagram illustrating a camera image that is obtained by photographing grass that is a kind of plant.

FIG. 5A is a diagram illustrating a camera image that is obtained by photographing grass 108a that is a kind of plant. Specifically, the grass 108a has the following morphological characteristics: [1] the height is relatively low, [2] the stem is relatively thin, [3] the branch is green, [4] the grass 108a extends obliquely upward from the outside of the road 104 to the inside thereof, and the like.

Figure 5B:
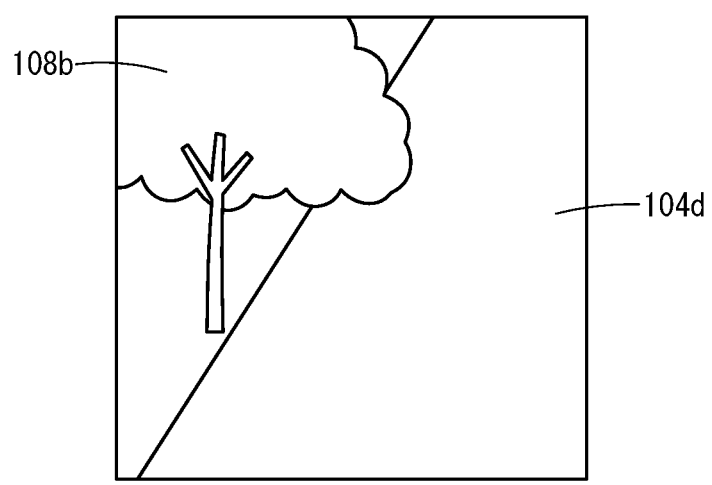
FIG. 5B is a diagram illustrating a camera image that is obtained by photographing a tree that is a kind of plant.

FIG. 5B is a diagram illustrating a camera image that is obtained by photographing a tree 108b that is a kind of plant. Specifically, the tree 108b has the following morphological characteristics: [1] the height is relatively high, [2] the stem is relatively thick, [3] the branch is brown, [4] the tree 108b extends laterally from the outside of the road 104 to the inside thereof, and the like.

If it is determined that the obstacle 112 does not have "plant attribute" (step S3: NO), the process advances to step S4.

In step S4, the action amount decision unit 76 decides the avoidance action amount of the user's own vehicle 100 so as to prohibit the contact with the obstacle 112, and the process advances to step S8 to be described below. Here, "avoidance action amount" means an action amount indicating the degree of an avoidance action with respect to the obstacle 112, or a control amount in order to achieve the action amount.

On the other hand, back to step S3, it is determined that the obstacle 112 has "plant attribute" in the examples in FIGS. 5A and 5B (step S3: YES), and the process therefore advances to step S5.

In step S5, the action amount decision unit 76 evaluates the influence degree to which the user's own vehicle 100 is affected by contact with the obstacle 112. Specifically, the action amount decision unit 76 estimates a hardness level of the obstacle 112 by using the influence degree information I1 and "plant attribute" described above. Note that as the hardness level is higher, the influence degree is higher, and on the other hand, as the hardness level is lower, the influence degree is lower.

FIG. 6A is a diagram illustrating one example of a data structure of the influence degree information I1. This influence degree information I1 is information that represents a list indicating a correspondence relation between "plant attribute" and "influence degree".

The plant attribute includes, for example, the type (tree, grass, Japanese pampas grass, and the like), the morphological characteristic (specifically, height, thickness of stem, curvature, color, and the like), and the motion (specifically, degree of shaking). For example, the influence degree consists of three levels "high", "middle", and "low".

Here, the action amount decision unit 76 acquires the influence degree (one of high/middle/low) corresponding to "plant attribute" of the obstacle 112 by reading out and referring to the influence degree information I1 in the storage device 52 (FIG. 1). Note that if the obstacle 112 includes a plurality of attributes, the action amount decision unit 76 may evaluate the influence degree by using statistical methods including a majority vote (mode).

In step S6, the action amount decision unit 76 acquires the preference information I2 of a user who is involved with the user's own vehicle 100. Specifically, the action amount decision unit 76 specifies an action type on the basis of the parameter (driving preference parameter) that is set in advance through the navigation device 24 (FIG. 1), and reads out and acquires the preference information I2 corresponding to the specified action type from the storage device 52 (FIG. 1). This "user" includes not only the driver but also an owner (individual or legal entity) of the user's own vehicle 100.

FIG. 6B is a diagram illustrating one example of a data structure of the preference information I2. This preference information I2 is information that represents a list indicating a correspondence relation between "influence degree", "action attribute", and "avoidance action amount". This preference information I2 is prepared for each of the different action types.

The influence degree consists of the three levels "high", "middle", and "low" that are already described with reference to FIG. 6A, and additionally includes a category "unknown". For example, the action attribute includes "avoidance with enough margin", "normal avoidance", and "contact is allowed". The avoidance action amount consists of parameters (in the example in the drawing, three kinds of "X", "Y", and "Z") that are associated with the action attributes. This avoidance action amount may be various parameters that specify avoidance routes P1 to P3 (FIG. 7) from an execution start position 116 to an execution end position 118. Specifically, the avoidance action amount may be a moving amount in a vehicle width direction, steering angular velocity, or deceleration.

In step S7, the action amount decision unit 76 decides the avoidance action amount that reflects the user's preference by using the preference information I2 acquired in step S6. Specifically, the action amount decision unit 76 refers to the preference information I2 and decides the parameter corresponding to the influence degree of the obstacle 112 as the avoidance action amount of the user's own vehicle 100.

In the example in FIG. 6B, in a case that the action type of the user is "A", as for the obstacle 112 for which and the influence degree is evaluated as "high", the avoidance action amount is decided as "X" indicating the avoidance action with enough margin. Moreover, as for the obstacle 112 for which the influence degree is evaluated as "middle", the avoidance action amount is decided as "Y" indicating the normal avoidance action.

Furthermore, as for the obstacle 112 for which the influence degree is evaluated as "low", the avoidance action amount is decided as "Z" indicating that the contact with the obstacle 112 is allowed. In addition, as for the obstacle 112 for which the influence degree is evaluated as "unknown", the avoidance action amount is decided as "Y" indicating the normal avoidance action.

In step S8, the avoidance execution determination unit 78 determines whether the user's own vehicle 100 has reached the execution start position 116 at which the avoidance action is started. If the user's own vehicle 100 has not reached the execution start position 116 yet (step S8: NO), the process remains in step S8 until the user's own vehicle 100 reaches the execution start position 116. On the other hand, if the user's own vehicle 100 has reached the execution start position 116 (step S8: YES), the process advances to the next step S9.

In step S9, the vehicle control unit 68 performs avoidance travel control in which the execution start position 116 is regarded as a start point. Before this control, the vehicle control unit 68 acquires event contents of the action plan created by the action plan creation unit 64 and the travel trajectory generated by the trajectory generation unit 66.

After that, the travel control unit 80 generates control signals in order to achieve the travel trajectory indicating the avoidance action with respect to the obstacle 112, and outputs each control signal to the driving force output device 40, the steering device 42, and the braking device 44. On the other hand, the notification control unit 82 generates a notification signal indicating notification contents (for example, the influence degree of the contact with the obstacle 112) that assist the avoidance action, and outputs this notification signal to the notification device 46.

Figure 7:
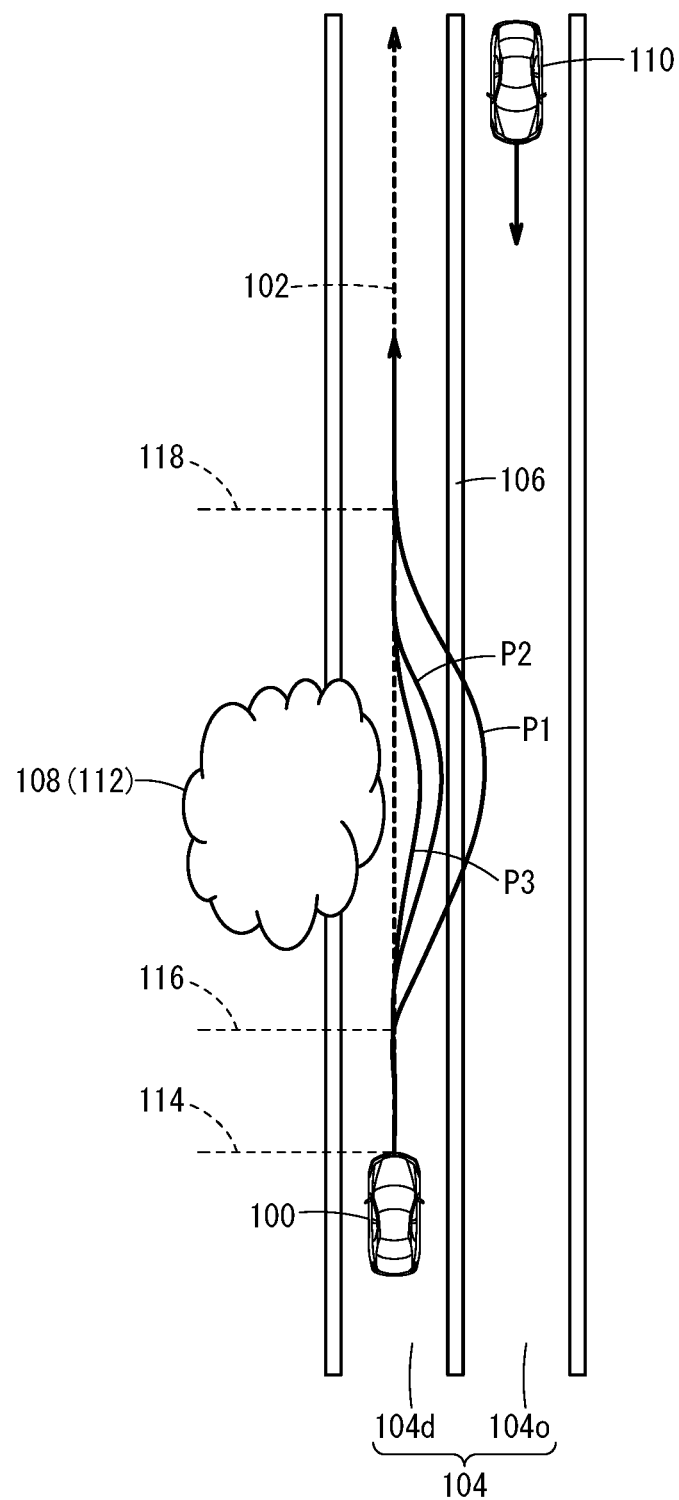
FIG. 7 is a diagram expressing types of an avoidance action with respect to an obstacle.

As illustrated in FIG. 7, the user's own vehicle 100 starts the avoidance action at the execution start position 116, moves along one of the avoidance routes P1, P2, P3 while avoiding the obstacle 112, and then, ends the avoidance action at the execution end position 118.

The avoidance route P1 is a route whose avoidance action amount is the largest, and allows the user's own vehicle 100 to cross over the lane mark 106 temporarily. On the other hand, the avoidance route P3 is a route whose avoidance action amount is the smallest, and permits the vehicle to contact with the obstacle 112. Note that the avoidance route P2 is a route indicating an avoidance action having an avoidance action amount that is between the amount of the avoidance routes P1, P3.

<Preferable Example of Deciding Avoidance Action Amount>

As described above, the flowchart in FIG. 3 ends. A preferable example of deciding the avoidance action amount (step S7) is hereinafter described in detail.

The action amount decision unit 76 may decide such an avoidance action amount that the vehicle passes the obstacle 112 while being in contact with the obstacle 112 at a smaller contact area than that in a case where the avoidance action is not taken. Thus, another option for the avoidance action is added in which the vehicle is permitted to pass the obstacle 112 while being in contact with the obstacle 112. Therefore, discretion for driving can be increased.

The action amount decision unit 76 may decide the avoidance action amount on the basis of the influence degree to which the vehicle is affected by the contact with the obstacle 112. Thus, the avoidance action in accordance with the influence degree of the contact can be taken.

The action amount decision unit 76 may evaluate the influence degree on the basis of the characteristic of the obstacle 112 (for example, morphological characteristic, mechanical characteristic, or physical characteristic), and decide the avoidance action amount on the basis of the obtained influence degree. Since the characteristic of the obstacle 112 is considered, the accuracy of an evaluation result of the influence degree is increased.

The action amount decision unit 76 may give the influence degree of the particular obstacle 108 that is an obstacle whose only tip portion is shaking, an obstacle that extends obliquely from the outside of the road 104 to the inside thereof, or an obstacle that has the morphological characteristic of the plant, a lower evaluation than the obstacle 112 other than the particular obstacle 108, and decide the avoidance action amount on the basis of the obtained influence degree. Thus, the avoidance action with respect to the particular obstacle 108 that is probably a plant can be suppressed, so that the influence on other traffic participants (for example, other vehicles 110) around the particular obstacle 108 is decreased.

The action amount decision unit 76 may decide the avoidance action amount in accordance with the material value of the user's own vehicle 100. This "material value" includes not only the monetary value or the scarcity value of the user's own vehicle 100 but also items correlated with this value (for example, total travel distance, total ownership period). Thus, the avoidance action in accordance with the material value of the user's own vehicle 100 can be selected while considering a possibility that the contact with the obstacle 112 causes the user's own vehicle 100 to be scratched or dented.

[Effects of Vehicle Control Device 10]

As described above, the vehicle control device 10 is a device configured to perform the travel control of the user's own vehicle 100 at least partially automatically, and the vehicle control device 10 includes: [1] the obstacle recognition unit 72 configured to recognize the obstacle 112 on the scheduled travel route 102 of the user's own vehicle 100; [2] the action amount decision unit 76 configured to decide the avoidance action amount indicating the degree of the avoidance action with respect to the recognized obstacle 112; and [3] the travel control unit 80 configured to perform the travel control that causes the user's own vehicle 100 to take the avoidance action in accordance with the decided avoidance action amount. [4] The action amount decision unit 76 is configured to decide the avoidance action amount in accordance with the preference of the user who is involved with the user's own vehicle 100.

Moreover, in this vehicle control method, one or a plurality of computers [1] recognize the obstacle 112 on the scheduled travel route 102 of the user's own vehicle 100 (step S1), [2] decide the avoidance action amount indicating the degree of the avoidance action with respect to the recognized obstacle 112 (step S4, S7), and [3] perform the travel control that causes the user's own vehicle 100 to take the avoidance action in accordance with the decided avoidance action amount (step S9). [4] The avoidance action amount is decided in accordance with the preference of the user who is involved with the user's own vehicle 100 in step S7.

As described above, the avoidance action amount indicating the degree of the avoidance action with respect to the obstacle 112 is decided in accordance with the preference of the user who is involved with the user's own vehicle 100. Thus, the avoidance action that appropriately reflects the user's driving intention can be taken. Therefore, the merchantability of the vehicle in the case where the vehicle avoids the obstacle 112 can be improved.

In particular, the vehicle control device 10 may further include the parameter input unit (navigation device 24) through which the parameter that is used for deciding the avoidance action amount is input in accordance with the user's operation, wherein the action amount decision unit 76 may decide the avoidance action amount by using the input parameter. Thus, the driving intention of the user can be recognized through the user's operation.

[Modification]

Subsequently, a configuration of a calculation device 130 in a modification of the above embodiment is described with reference to FIG. 8. Note that the configuration or the function similar to that of the calculation device 50 in FIG. 2 may be denoted by the same reference symbols, and the description thereof may be omitted.

<Specific Configuration of Calculation Device 130>

Figure 8:
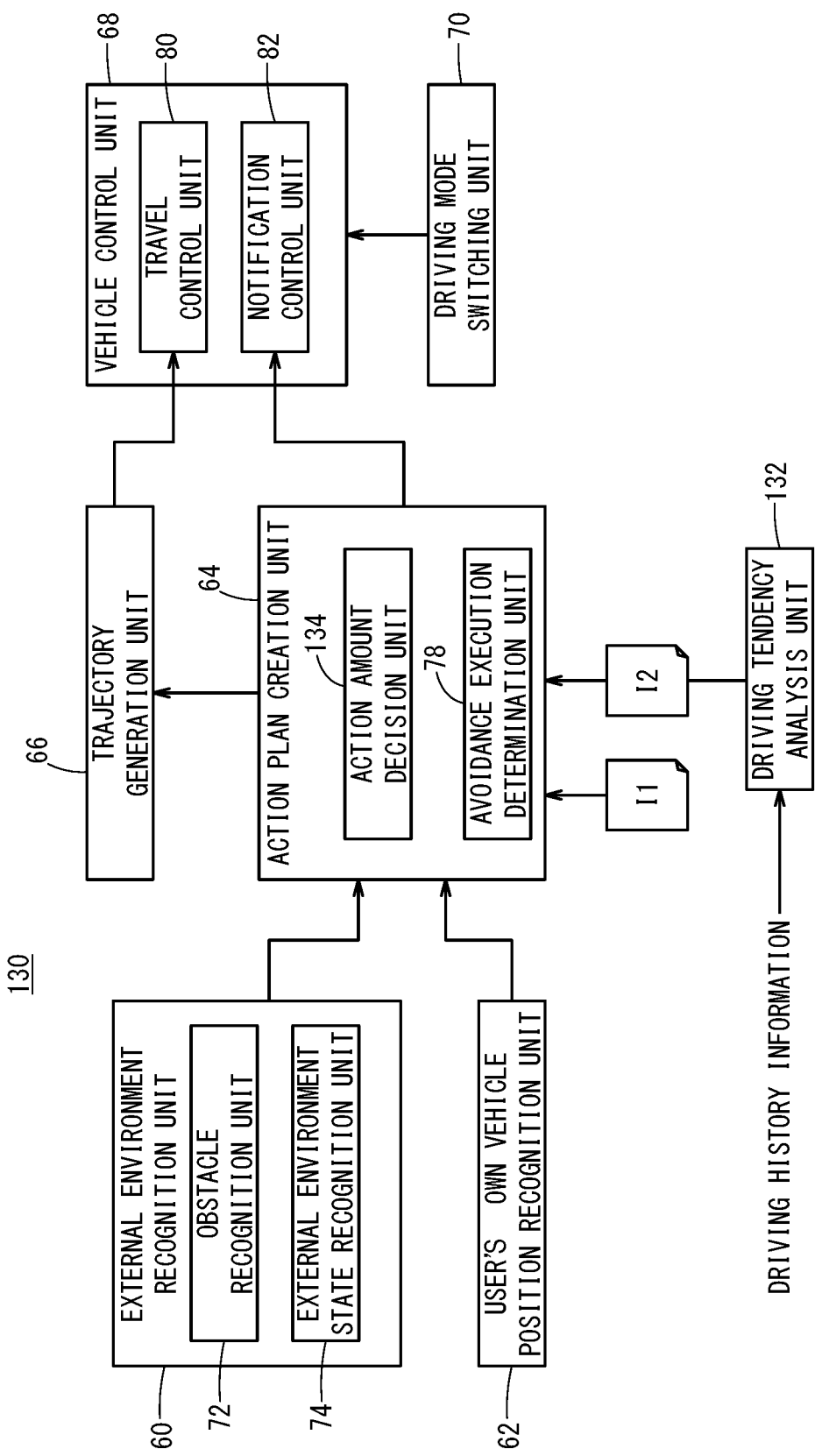
FIG. 8 is a function block diagram of a calculation device in a modification.

FIG. 8 is a function block diagram of the calculation device 130 in the modification. This calculation device 130 is configured to perform various functions of the external environment recognition unit 60, the user's own vehicle position recognition unit 62, the action plan creation unit 64, the trajectory generation unit 66, the vehicle control unit 68, the driving mode switching unit 70, and moreover, a driving tendency analysis unit 132.

The action plan creation unit 64 includes, in addition to the avoidance execution determination unit 78, an action amount decision unit 134 that is different in function from that in FIG. 2. Note that the action plan creation unit 64 is configured such that the influence degree information I1 and the preference information I2, in addition to the recognition results from the external environment recognition unit 60 and the user's own vehicle position recognition unit 62, can be input thereto.

<Operation of Calculation Device 130>

The vehicle control device 10 including this calculation device 130 basically operates in accordance with the flowchart in FIG. 3. Hereinafter, steps S6, S7, which are different from those in the calculation device 50 (FIG. 2), are described.

In step S6, the action amount decision unit 134 acquires the preference information I2 of the user who is involved with the user's own vehicle 100. Before this acquisition, the driving tendency analysis unit 132 analyzes a driving tendency by using information about the past driving by the driver of the user's own vehicle 100 (hereinafter, referred to as driving history information), and generates the preference information I2 as an analysis result. Here, the driving history information is information in which the input information by the input system device group 14 and the output information by the output system device group 16 (including the operation amount by the driver) are associated with each other by time, and it is only necessary that the driving history of the user's own vehicle 100 in each traveling situation can be specified.

Specifically, the driving tendency analysis unit 132 sets [1] the relation between "influence degree" and "action characteristic" and [2] the relation between "action characteristic" and "avoidance action amount" by using a well-known artificial intelligence technique (for example, neural network, machine learning, or deep learning) to thereby generate the preference information I2 that is customized for each driver.

In step S7, the action amount decision unit 134 decides the avoidance action amount that reflects the user's preference by using the preference information I2 acquired in step S6. Specifically, the action amount decision unit 134 refers to the preference information I2 and decides the parameter corresponding to the influence degree of the obstacle 112, as the avoidance action amount of the user's own vehicle 100.

<Effects by Calculation Device 130>

Even in the above configuration, the same effects as those in the above embodiment (calculation device 50 in FIG. 2) can be obtained. That is to say, the avoidance action amount indicating the degree of the avoidance action with respect to the obstacle 112 is decided in accordance with the preference of the user who is involved with the user's own vehicle 100. Thus, the avoidance action that appropriately reflects the user's driving intention can be taken. Therefore, the merchantability of the vehicle in the case where the vehicle avoids the obstacle 112 can be improved.

The driving tendency analysis unit 132 may analyze the driving tendency of the driver of the user's own vehicle 100, which is a user, by using the driving history information about the past driving performed by the driver, and the action amount decision unit 134 may decide the avoidance action amount in accordance with the driving tendency of the driver analyzed by the driving tendency analysis unit 132. Thus, the driving intention of the driver can be reflected automatically without the need for the driver to perform a special operation.

Moreover, the driving tendency analysis unit 132 may analyze the driving tendency only in the case where the driver performs manual driving. Since only the driving operation by the driver is extracted and analyzed, the driving tendency of the driver can be understood with high accuracy.

[Supplement]

The present invention is not limited to the embodiment described above, and can be changed freely within the range not departing from the concept of the present invention. Alternatively, the configurations can be combined arbitrarily within the range not contradicting each other technically.

The invention claimed is:

1. A vehicle control device that performs travel control of a user's own vehicle at least partially automatically, the vehicle control device comprising one or more processors, wherein the one or more processors:
   recognize an obstacle on a scheduled travel route of the user's own vehicle;
   determine an expected contact area of the obstacle with which the user's own vehicle would make contact without the performance of an avoidance action travel control by the user's own vehicle;
   decide a range of avoidance action amounts indicating a degree of an avoidance action with respect to the obstacle recognized by the one or more processors, the range of avoidance action amounts being between full avoidance of the obstacle and contact with the obstacle along the expected contact area thereof;
   decide a particular avoidance action amount from the range of avoidance action amounts that allows the user's own vehicle to make contact with the obstacle along a contact area of the obstacle that is smaller than the expected contact area of the obstacle;
   analyze a driving tendency of a driver of the user's own vehicle, which is a user, by using driving history information about past driving performed by the driver;
   modify the particular avoidance action amount in accordance with the driving tendency of the driver analyzed by the one or more processors; and
   perform the avoidance action travel control that causes the user's own vehicle to avoid the obstacle in accordance with the particular avoidance action amount.

2. The vehicle control device according to claim 1, wherein the one or more processors decide the particular avoidance action amount, also based on an influence degree of contact with the obstacle.

3. The vehicle control device according to claim 2, wherein the one or more processors evaluate the influence degree, based on a characteristic of the obstacle, and decide the particular avoidance action amount, based on the obtained influence degree.

4. The vehicle control device according to claim 3, wherein the one or more processors give the influence degree of a particular obstacle that is an obstacle whose only tip portion is shaking, an obstacle that extends obliquely from outside of a road to inside thereof, or an obstacle that has a morphological characteristic of a plant, a lower evaluation than the obstacle other than the particular obstacle, and decide the particular avoidance action amount, based on the obtained influence degree.

5. The vehicle control device according to claim 1, wherein the one or more processors decide the particular avoidance action amount in accordance with material value of the user's own vehicle.

6. The vehicle control device according to claim 1, further comprising a parameter input unit through which a parameter that is used for deciding the particular avoidance action amount is input in accordance with the user's operation,
   wherein the one or more processors decide the particular avoidance action amount by using the parameter that is input from the parameter input unit.

7. The vehicle control device according to claim 1, wherein the one or more processors analyze the driving tendency only in a case where the driver performs manual driving.

8. The vehicle control device according to claim 1, wherein, if the obstacle recognized by the one or more processors is a particular obstacle, the one or more processors decides the particular avoidance action amount that permits the user's own vehicle to contact with the particular obstacle.

* * * * *